(12) United States Patent
Liu

(10) Patent No.: US 11,997,295 B2
(45) Date of Patent: May 28, 2024

(54) IMAGE COMPRESSION METHOD AND COMPRESSION DEVICE CAPABLE OF IMPROVING COMPRESSION RATE

(71) Applicant: TCL CHINA STAR OPTOELECTRONICS TECHNOLOGY CO., LTD., Shenzhen (CN)

(72) Inventor: Jinfeng Liu, Shenzhen (CN)

( * ) Notice: Subject to any disclaimer, the term of this patent is extended or adjusted under 35 U.S.C. 154(b) by 408 days.

(21) Appl. No.: 17/428,302

(22) PCT Filed: May 28, 2021

(86) PCT No.: PCT/CN2021/096606
§ 371 (c)(1),
(2) Date: Aug. 4, 2021

(87) PCT Pub. No.: WO2022/205603
PCT Pub. Date: Oct. 6, 2022

(65) Prior Publication Data
US 2023/0362394 A1    Nov. 9, 2023

(30) Foreign Application Priority Data

Apr. 1, 2021 (CN) .......................... 202110353826.6

(51) Int. Cl.
*H04N 19/186* (2014.01)
*H04N 19/182* (2014.01)
(52) U.S. Cl.
CPC ......... *H04N 19/186* (2014.11); *H04N 19/182* (2014.11)

(58) Field of Classification Search
None
See application file for complete search history.

(56) References Cited

U.S. PATENT DOCUMENTS

2011/0216834 A1* 9/2011 Zhou ...................... H04N 19/91
375/E7.076
2012/0014597 A1* 1/2012 Matsunaga ............ H04N 1/644
382/166
(Continued)

FOREIGN PATENT DOCUMENTS

CN           1464744 A    12/2003
CN         104464594 A     3/2015
(Continued)

*Primary Examiner* — Tahmina N Ansari

(57) ABSTRACT

An image compression method includes: obtaining a grayscale pixel information of an original image, wherein the grayscale pixel information comprises a plurality of sub-grayscale pixel information; scanning the plurality of sub-grayscale pixel information according to a preset first scanning sequence to obtain a first target grayscale pixel information; dividing the first target grayscale pixel information into a plurality of first grayscale areas according to a preset first grayscale difference threshold to generate a first area information; and compressing the sub-grayscale pixel information of each first grayscale area according to the first minimum grayscale pixel value, the first area label, and the plurality of sub-grayscale pixel information, to obtain a first compressed data of the original image. An image compression device, a computer device, and a computer readable storage medium are also provided.

20 Claims, 9 Drawing Sheets

(56) References Cited

U.S. PATENT DOCUMENTS

2020/0242810 A1* 7/2020 Park .......................... G06T 7/11
2020/0336754 A1* 10/2020 Sasaki .................. H04N 19/182
2023/0362394 A1* 11/2023 Liu ...................... H04N 19/182

FOREIGN PATENT DOCUMENTS

| CN | 105959584 A | 9/2016 |
|---|---|---|
| CN | 107846589 A | 3/2018 |
| CN | 108810498 A | 11/2018 |
| CN | 109844809 A | 6/2019 |
| CN | 110689846 A | 1/2020 |
| JP | 2005004344 A | 1/2005 |
| TW | 200941406 A | 10/2009 |

* cited by examiner

|    |     |     |     |     |     |     |     |
|----|-----|-----|-----|-----|-----|-----|-----|
| 77 | 92  | 117 | 143 | 164 | 177 | 186 | 91  |
| 70 | 79  | 98  | 125 | 155 | 178 | 189 | 190 |
| 67 | 71  | 83  | 110 | 148 | 180 | 192 | 191 |
| 72 | 72  | 77  | 101 | 142 | 179 | 193 | 190 |
| 73 | 75  | 80  | 98  | 136 | 175 | 192 | 191 |
| 71 | 75  | 81  | 95  | 130 | 169 | 189 | 190 |
| 67 | 75  | 82  | 93  | 125 | 164 | 186 | 190 |
| 71 | 70  | 73  | 86  | 119 | 159 | 182 | 186 |

FIG. 2

| 77 | 70 | 67 | 72 | 73 | 71 | 67 | 71 | 70 | 75 | 75 | 75 | 72 | 71 | 79 | 92 | 117 | 98 | 83 | 77 | 80 | 81 | 82 | 73 |

FIG. 3

| 77 | 92 | 117 | 143 | 164 | 177 | 186 | 191 |
|---|---|---|---|---|---|---|---|
| 70 | 79 | 98 | 125 | 155 | 178 | 189 | 190 |
| 67 | 71 | 83 | 110 | 148 | 180 | 192 | 191 |
| 72 | 72 | 77 | 101 | 142 | 179 | 193 | 190 |
| 73 | 75 | 80 | 98 | 136 | 175 | 192 | 191 |
| 71 | 75 | 81 | 95 | 130 | 169 | 189 | 190 |
| 67 | 75 | 82 | 93 | 125 | 164 | 186 | 190 |
| 71 | 70 | 73 | 86 | 119 | 159 | 182 | 186 |

FIG. 4

| 77 | 92 | 117 | 143 | 164 | 177 | 186 | 191 |
|----|----|-----|-----|-----|-----|-----|-----|
| 70 | 79 | 98 | 125 | 155 | 178 | 189 | 190 |
| 67 | 71 | 83 | 110 | 148 | 180 | 192 | 191 |
| 72 | 72 | 77 | 101 | 142 | 179 | 193 | 190 |
| 73 | 75 | 80 | 98 | 136 | 175 | 192 | 191 |
| 71 | 75 | 81 | 95 | 130 | 169 | 189 | 190 |
| 67 | 75 | 82 | 93 | 125 | 164 | 186 | 190 |
| 71 | 70 | 73 | 86 | 119 | 159 | 182 | 186 |

FIG. 5 obtaining the first minimum grayscale pixel value and the number of bits of the first minimum grayscale pixel value of each first grayscale area in the plurality of first grayscale areas, and obtaining a sub-minimum grayscale pixel parameter of each first grayscale area in the plurality of first grayscale areas according to the first minimum grayscale pixel value and the number of bits of the first minimum grayscale pixel value — S901 obtaining the grayscale pixel parameter according to the sub-minimum grayscale pixel parameter of each first grayscale area in the plurality of first grayscale areas — S902

FIG. 9 obtaining the compression ratio according to the first compressed data and the first area information, and determining whether the compression ratio is less than or equal to a preset compression ratio — S1001 on the condition that the compression ratio is greater than a preset compression ratio, determining a second grayscale difference threshold — S1002 dividing the first target grayscale pixel information into a plurality of second grayscale areas according to the second grayscale difference threshold to generate a second area information, wherein the second area information includes a second minimum grayscale pixel value and a second area label of each second grayscale area in the plurality of second grayscale areas — S1003 compressing the sub-grayscale pixel information of each second grayscale area according to the second minimum grayscale pixel value, the second area label, and the plurality of sub-grayscale pixel information, to obtain a second compressed data of the original image — S1004

FIG. 10

| 77 | 70 | 67 | 72 | 73 | 71 | 67 | 71 | 70 | 75 | 75 | 75 | 72 | 71 | 79 | 92 | 117 | 98 | 83 | 77 | 80 | 81 | 82 | 73 |
| 10 | 3 | 0 | 5 | 6 | 4 | 0 | 4 | 3 | 8 | 8 | 8 | 5 | 4 | 12 | 0 | 0 | 15 | 0 | 4 | 7 | 8 | 9 | 0 |

|←——————————— 67 ———————————→|←92→|117|←83→|←——— 73 ———→|

FIG. 11

```
obtaining the compression ratio according to the first compressed data and the        ── S1201
first area information, and determining whether the compression ratio is less than
              or equal to a preset compression ratio
                              ↓
on the condition that the compression ratio is greater than a preset compression     ── S1202
              ratio, determining a second scanning sequence
                              ↓
scanning the plurality of sub-grayscale pixel information according to the second    ── S1203
     scanning sequence to obtain a second target grayscale pixel information
                              ↓
   dividing the second target grayscale pixel information into a plurality of third  ── S1204
     grayscale areas according to a preset first grayscale difference threshold to
 generate a third area information, wherein the third area information includes a
third minimum grayscale pixel value and a third area label of each third grayscale
            area in the plurality of third grayscale areas
                              ↓
   compressing the sub-grayscale pixel information of each third grayscale area      ── S1205
     according to the third minimum grayscale pixel value, the third area label, and
the plurality of sub-grayscale pixel information, to obtain a third compressed data
                         of an original image
```

FIG. 12

IMAGE COMPRESSION METHOD AND COMPRESSION DEVICE CAPABLE OF IMPROVING COMPRESSION RATE

TECHNICAL FIELD

The present disclosure relates to a field of image processing technology, and more particularly to an image compression method and an image compression device.

BACKGROUND

Conventional display panels directly store and transmit original data. As screen resolution increases, display data that needs to be transmitted also increases. On condition that the original data is directly stored and transmitted, a huge storage space and higher transmission efficiency are required, which lead to an increase in memory capacity and power consumption of the display panels.

It is necessary to provide an image compression method and compression device to solve a technical problem of the increase in the memory capacity and power consumption of the display panel in the prior art caused by the direct storage and transmission of the original data.

SUMMARY

The present disclosure provides an image compression method and an image compression device, which can solve the technical problem that the memory capacity and power consumption of the display panel increase caused by the direct storage and transmission of the original data in the prior art.

In one aspect, the present disclosure provides an image compression method, and the image compression method includes:

Obtaining a grayscale pixel information of an original image, and the grayscale pixel information includes a plurality of sub-grayscale pixel information.

Scanning the plurality of sub-grayscale pixel information according to a preset first scanning sequence to obtain a first target grayscale pixel information.

Dividing the first target grayscale pixel information into a plurality of first grayscale areas according to a preset first grayscale difference threshold to generate a first area information, and the first area information includes a first minimum grayscale pixel value and a first area label of each first grayscale area in the plurality of first grayscale areas.

Compressing the sub-grayscale pixel information of each first grayscale area according to the first minimum grayscale pixel value, the first area label and the plurality of sub-grayscale pixel information, to obtain a first compressed data of an original image.

In an alternative embodiment of the present disclosure, the step of compressing the sub-grayscale pixel information of each first grayscale area according to the first minimum grayscale pixel value, the first area label and the plurality of sub-grayscale pixel information, to obtain a first compressed data of an original image includes:

Determining a current first grayscale area and the first minimum grayscale pixel value of the current first grayscale area according to the first area label.

Subtracting the first minimum grayscale pixel value from each sub-grayscale pixel information in the current first grayscale area to obtain the first compressed data of the original image.

In an alternative embodiment of the present disclosure, in each of the first grayscale areas, a difference value between a maximum sub-grayscale pixel information and a minimum sub-grayscale pixel information is smaller than the first grayscale difference threshold.

In an alternative embodiment of the present disclosure, the image compression method further includes:

Obtaining a compression ratio according to the first compressed data and the first area information, and determining whether the compression ratio is less than or equal to a preset compression ratio.

On condition that the compression ratio is greater than a preset compression ratio, determining a second grayscale difference threshold.

Dividing the first target grayscale pixel information into a plurality of second grayscale areas according to the second grayscale difference threshold to generate a second area information, and the second area information includes a second minimum grayscale pixel value and a second area label of each second grayscale area in the plurality of second grayscale areas.

Compressing the sub-grayscale pixel information of each second grayscale area according to the second minimum grayscale pixel value, the second area label and the plurality of sub-grayscale pixel information, to obtain a second compressed data of the original image.

In an alternative embodiment of the present disclosure, the sub-grayscale pixel information, the first area label, the first minimum grayscale pixel value, and the first compressed data are represented by binary numbers, the step of obtaining a compression ratio according to the first compressed data and the first area information includes:

Obtaining an original pixel parameter according to a number of the plurality of sub-grayscale pixel information and a number of bits of the plurality of sub-grayscale pixel information.

Obtaining a compressed data parameter according to the number of the plurality of sub-grayscale pixel information and a number of bits of the first compressed data.

Obtaining a minimum grayscale pixel parameter according to a number of the first minimum grayscale pixel value and a number of bits of the first minimum grayscale pixel value.

Obtaining an area label parameter according to a number of the first area label and a number of bits of the first area label.

Obtaining a compressed pixel parameter according to the compressed data parameter, the minimum grayscale pixel parameter, and the area label parameter.

Obtaining the compression ratio according to the original pixel parameter and the compressed pixel parameter.

In an alternative embodiment of the present disclosure, the first minimum grayscale pixel value of each first grayscale area in the plurality of first grayscale areas is different; the step of obtaining a minimum grayscale pixel parameter according to a number of the first minimum grayscale pixel value and a number of bits of the first minimum grayscale pixel value includes:

Obtaining the first minimum grayscale pixel value and the number of bits of the first minimum grayscale pixel value of each first grayscale area in the plurality of first grayscale areas, and obtaining a sub-minimum grayscale pixel parameter of each first grayscale area in the plurality of first grayscale areas according to the first minimum grayscale pixel value and the number of bits of the first minimum grayscale pixel value.

Obtaining the grayscale pixel parameter according to the sub-minimum grayscale pixel parameter of each first grayscale area in the plurality of first grayscale areas.

In an alternative embodiment of the present disclosure, after the step of scanning the plurality of sub-grayscale pixel information according to a preset first scanning sequence to obtain a first target grayscale pixel information, the image compression method further includes:

Setting the first grayscale difference threshold Th to 2B−1, and the B stands for a number of bits of the first compressed data.

In an alternative embodiment of the present disclosure, the first area label occupies one bit, a value of the first area label is 0 or 1, and values of the first area labels of two adjacent first grayscale areas are different from each other.

In an alternative embodiment of the present disclosure, the image compression method further includes:

Obtaining the compression ratio according to the first compressed data and the first area information, and determining whether the compression ratio is less than or equal to a preset compression ratio.

On the condition that the compression ratio is greater than a preset compression ratio, determining a second scanning sequence.

Scanning the plurality of sub-grayscale pixel information according to the second scanning sequence to obtain a second target grayscale pixel information.

Dividing the second target grayscale pixel information into a plurality of third grayscale areas according to a preset first grayscale difference threshold to generate a third area information, and the third area information includes a third minimum grayscale pixel value and a third area label of each third grayscale area in the plurality of third grayscale areas.

Compressing the sub-grayscale pixel information of each third grayscale area according to the third minimum grayscale pixel value, the third area label and the plurality of sub-grayscale pixel information, to obtain a third compressed data of an original image.

In another aspect, the present disclosure provides an image compression device, including:

An obtaining unit, configured to obtain a grayscale pixel information of an original image, and the grayscale pixel information includes a plurality of sub-grayscale pixel information.

A scanning unit, configured to scan the plurality of sub-grayscale pixel information according to a preset first scanning sequence to obtain a first target grayscale pixel information.

An area dividing unit, configured to divide the first target grayscale pixel information into a plurality of first grayscale areas according to a preset first grayscale difference threshold to generate a first area information, and the first area information includes a first minimum grayscale pixel value and a first area label of each first grayscale area in the plurality of first grayscale areas.

A compressing unit, configured to compress the sub-grayscale pixel information of each first grayscale area according to the first minimum grayscale pixel value, the first area label and the plurality of sub-grayscale pixel information, to obtain a first compressed data of an original image.

In an alternative embodiment of the present disclosure, the compressing unit is configured to: determine a current first grayscale area and the first minimum grayscale pixel value of the current first grayscale area according to the first area label; and subtract the first minimum grayscale pixel value from each sub-grayscale pixel information in the current first grayscale area to obtain the first compressed data of the original image.

In an alternative embodiment of the present disclosure, the image compression device further includes a first adjusting unit, the first adjusting unit is configured to: obtain a compression ratio according to the first compressed data and the first area information, and determine whether the compression ratio is less than or equal to a preset compression ratio; on condition that the compression ratio is greater than a preset compression ratio, determine a second grayscale difference threshold; divide the first target grayscale pixel information into a plurality of second grayscale areas according to the second grayscale difference threshold to generate a second area information, and the second area information includes a second minimum grayscale pixel value and a second area label of each second grayscale area in the plurality of second grayscale areas; and compress the sub-grayscale pixel information of each second grayscale area according to the second minimum grayscale pixel value, the second area label, and the plurality of sub-grayscale pixel information, to obtain a second compressed data of the original image.

In an alternative embodiment of the present disclosure, the image compression device includes a second adjusting unit, the second adjusting unit is configured to: obtain the compression ratio according to the first compressed data and the first area information, and determine whether the compression ratio is less than or equal to a preset compression ratio; on the condition that the compression ratio is greater than a preset compression ratio, determine a second scanning sequence; scan the plurality of sub-grayscale pixel information according to the second scanning sequence to obtain a second target grayscale pixel information; divide the second target grayscale pixel information into a plurality of third grayscale areas according to a preset first grayscale difference threshold to generate a third area information, and the third area information includes a third minimum grayscale pixel value and a third area label of each third grayscale area in the plurality of third grayscale areas; and compress the sub-grayscale pixel information of each third grayscale area according to the third minimum grayscale pixel value, the third area label, and the plurality of sub-grayscale pixel information, to obtain a third compressed data of an original image.

In another aspect, the present disclosure provides a computer device, including:
 a processor or a plurality of processors;
 a memory; and
 a computer program or a plurality of computer programs, wherein the computer program or the plurality of computer programs are stored in the memory, and the computer program or the plurality of computer programs are configured to execute the steps in the image compression method of any one of the above.

In another aspect, the present disclosure provides a computer readable storage medium, a computer program is stored in the computer readable storage medium, and the computer program is loaded by a processor to execute the steps in the image compression method of any one of the above.

The present disclosure provides an image compression method and an image compression device. A plurality of sub-grayscale pixel information are scanned according to a preset first scanning sequence to obtain a first target grayscale pixel information. The first target grayscale pixel information is divided into a plurality of first grayscale areas according to a preset first grayscale difference threshold, and a first minimum grayscale pixel value and a first area label of each first grayscale area in the plurality of first grayscale areas are obtained. And the sub-grayscale pixel information of each first grayscale area is compressed according to the first minimum grayscale pixel value and the first area label, so that a high-grayscale grayscale pixel information is converted into a low-grayscale first compressed data. The data transmission volume of the image in the transmission process is reduced, the transmission rate is increased, and the power consumption is reduced. The compressed data after compression also occupies a smaller memory space, which reduces the storage space. Furthermore, by dividing the first target grayscale pixel information into a plurality of first grayscale areas, each first grayscale area is compressed, and the compression rate of the image compression method is further improved.

DESCRIPTION OF DRAWINGS

The embodiments of the present disclosure will be described hereinafter with reference to the accompanying drawings, the technical solutions and the beneficial effects of the present disclosure will be obviously.

FIG. 2 is a schematic diagram of a first embodiment of S102 provided by an embodiment of the present disclosure.

FIG. 3 is a schematic diagram of an embodiment of target grayscale information provided by an embodiment of the present disclosure.

FIG. 4 is a schematic diagram of a second embodiment of S102 provided by an embodiment of the present disclosure.

FIG. 5 is a schematic diagram of a third embodiment of S102 provided by an embodiment of the present disclosure.

FIG. 9 is a schematic flowchart of an embodiment of S803 provided by an embodiment of the present disclosure.

FIG. 10 is a schematic flowchart of an embodiment of adjusting the compression ratio provided by an embodiment of the present disclosure.

FIG. 11 is a schematic diagram of an embodiment after adjusting the compression ratio provided by an embodiment of the present disclosure.

FIG. 12 is a schematic flowchart of another embodiment of adjusting the compression ratio provided by an embodiment of the present disclosure.

DETAILED DESCRIPTION OF PREFERRED EMBODIMENTS

The following embodiments refer to the accompanying drawings for exemplifying specific implementable embodiments of the present disclosure in a suitable computing environment. It should be noted that the exemplary described embodiments are configured to describe and understand the present disclosure, but the present disclosure is not limited thereto.

The terms "first" and "second" in the present disclosure are used to distinguish between different objects and are not used to describe a particular order. In addition, the terms "includes" and "has" and any variations of them are intended to cover non-exclusive inclusion. For example, a process, method, system, product, or device that includes a series of steps or modules is not limited to the listed steps or modules, but optionally also includes steps or modules that are not listed, or optionally also includes other steps or modules that are inherent to these processes, methods, products, or devices.

References herein to "embodiments" mean that particular features, structures, or characteristics described in connection with an embodiment may be included in at least one embodiment of the present disclosure. The appearance of the phrase in various places in the specification does not necessarily mean the same embodiment, nor is it a separate or alternative embodiment namely mutually exclusive with other embodiments. It is understood, both explicitly and implicitly, by those skilled in the art that the embodiments described herein may be combined with other embodiments.

The present disclosure provides an image compression method and an image compression device, detailed descriptions are given below.

In one aspect, the present disclosure provides an image compression method, and the image compression method includes: obtaining a grayscale pixel information of an original image, wherein the grayscale pixel information includes a plurality of sub-grayscale pixel information; scanning the plurality of sub-grayscale pixel information according to a preset first scanning sequence to obtain a first target grayscale pixel information; dividing the first target grayscale pixel information into a plurality of first grayscale areas according to a preset first grayscale difference threshold to generate a first area information, wherein the first area information includes a first minimum grayscale pixel value and a first area label of each first grayscale area in the plurality of first grayscale areas; and compressing the sub-grayscale pixel information of each first grayscale area according to the first minimum grayscale pixel value, the first area label and the plurality of sub-grayscale pixel information to obtain a first compressed data of an original image.

Figure 1:
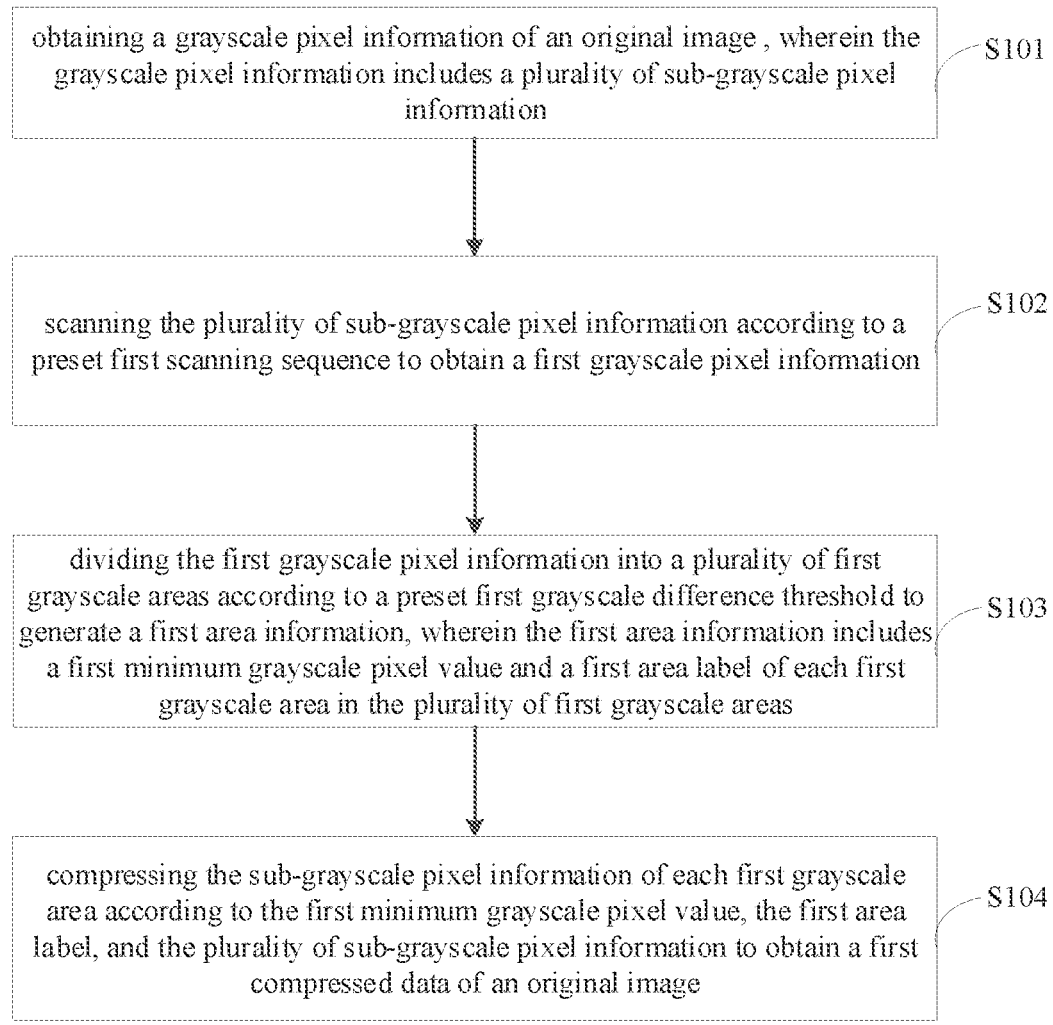
FIG. 1 is a schematic flowchart of an embodiment of an image compression method provided by an embodiment of the present disclosure.

Referring to FIG. 1, a schematic flowchart of an embodiment of an image compression method is provided by an embodiment of the present disclosure. The method includes:

S101, obtaining a grayscale pixel information of an original image, wherein the grayscale pixel information includes a plurality of sub-grayscale pixel information.

The original image includes but is not limited to red sub-pixels, green sub-pixels, and blue sub-pixels. When obtaining the grayscale pixel information of the original image, the grayscale pixel information of different sub-pixels may be obtained respectively. Specifically, the step of obtaining the grayscale pixel information of the original image includes: obtaining grayscale pixel information of the red sub-pixels, or obtaining grayscale pixel information of the green sub-pixels, or obtaining grayscale pixel information of the blue sub-pixels.

Further, the grayscale pixel information of each sub-pixel includes a plurality of sub-grayscale pixel information.

S102, scanning the plurality of sub-grayscale pixel information according to a preset first scanning sequence to obtain a first target grayscale pixel information.

It should be noted that, in some embodiments of the present disclosure, the grayscale pixel information of the original image is pixel information in a two-dimensional sequence, and the first target grayscale pixel information is pixel information in a one-dimensional sequence.

The grayscale pixel information of the two-dimensional sequence of the original image is converted into the target pixel information of the one-dimensional sequence by scanning, which is beneficial to dividing the grayscale area.

S103, dividing the first target grayscale pixel information into a plurality of first grayscale areas according to a preset first grayscale difference threshold to generate a first area information, wherein the first area information includes a first minimum grayscale pixel value and a first area label of each first grayscale area in the plurality of first grayscale areas.

The first area label stands for different grayscale areas. The first minimum grayscale pixel value stands for the pixel value of the first minimum grayscale pixel in each first grayscale area.

S104, compressing the sub-grayscale pixel information of each first grayscale area according to the first minimum grayscale pixel value, the first area label, and the plurality of sub-grayscale pixel information to obtain a first compressed data of an original image.

The present disclosure provides an image compression method. During image compression, a plurality of sub-grayscale pixel information is scanned according to a preset first scanning sequence to obtain a first target grayscale pixel information. The first target grayscale pixel information is divided into a plurality of first grayscale areas according to a preset first grayscale difference threshold, and a first minimum grayscale pixel value and a first area label of each first grayscale area in the plurality of first grayscale areas are obtained. And the sub-grayscale pixel information of each first grayscale area is compressed according to the first minimum grayscale pixel value and the first area label, so that a high-grayscale grayscale pixel information is converted into a low-grayscale first compressed data. The data transmission volume of the image in the transmission process is reduced, the transmission rate is increased, and the power consumption is reduced. The compressed data after compression also occupies a smaller memory space, which reduces the storage space. Furthermore, by dividing the first target grayscale pixel information into a plurality of first grayscale areas, each first grayscale area is compressed, and the compression rate of the image compression method is further improved.

Referring to FIG. 2, a schematic diagram of the first embodiment of S102 is provided by an embodiment of the present disclosure. Specifically, the grayscale pixel information of the original image is an 8*8 matrix. Namely, the original image includes 64 sub-grayscale pixel information. The scanning sequence is the scanning sequence of from row to column as indicated by the arrow in FIG. 2. Taking scanning first three columns as an example, as shown in FIG. 3, the first target grayscale pixel information obtained after scanning is one-dimensional 24 sub-grayscale pixel information.

Referring to FIG. 4, in some other embodiments of this disclosure, the scanning sequence is the scanning sequence of from row to column as indicated by the arrow in FIG. 4. In some other embodiments of the present disclosure, the scanning sequence is the scanning sequence of the nine-square grid shown by the arrow in FIG. 5.

It should be understood that the scanning sequence is not limited to the above-mentioned scanning sequence. The scanning sequence may also be interval scanning or other scanning sequence, which is not limited here.

Figure 6:
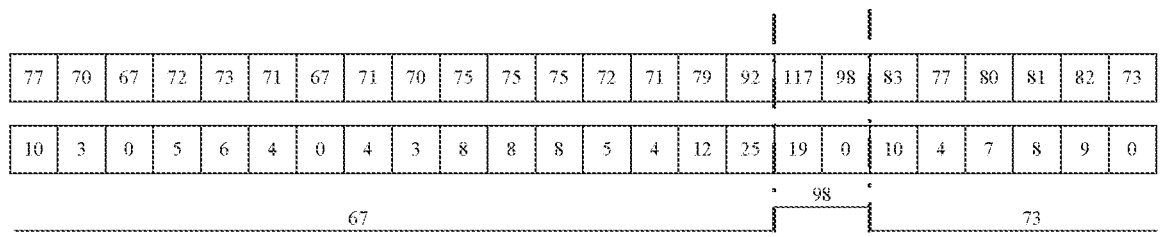
FIG. 6 is a schematic diagram of an embodiment of S103 provided by an embodiment of the present disclosure.

Referring to FIG. 6, a schematic diagram of an embodiment of S103 is provided by an embodiment of the present disclosure. Specifically, take the first target grayscale pixel information in FIG. 3 as an example for introduction. The principle of dividing the first grayscale area is: the difference between the maximum sub-grayscale pixel information and the minimum sub-grayscale pixel information in each first grayscale area is smaller than the first grayscale difference threshold. The maximum sub-grayscale pixel information refers to the sub-grayscale pixel information with the largest grayscale pixel value in the first grayscale area. The minimum sub-grayscale pixel information refers to the sub-grayscale pixel information with the smallest grayscale pixel value in the first grayscale area. Referring to FIG. 6, when the compressed data is 5 bits and the first grayscale difference threshold is 31, a first grayscale pixel value is 77, and a second grayscale pixel value is 70, then the difference between the maximum sub-grayscale pixel information and the minimum sub-grayscale pixel information is 7, and the difference is less than 31. Continue to expand the area to a third grayscale pixel, the third grayscale pixel value is 67, the maximum sub-grayscale pixel information is 77, the minimum sub-grayscale pixel information is 67, and the difference between the two is 10, the difference is still less than 31. Continue to expand the area until the sub-grayscale pixel information with a grayscale pixel value of 117 is reached. The sub-grayscale pixel information is the maximum sub-grayscale pixel information, and the difference between it and the minimum sub-grayscale pixel information is 50, the difference is greater than the first grayscale difference threshold. Then, the range of the first grayscale area is the first sub-grayscale pixel information and a previous sub-grayscale pixel information of the sub-grayscale pixel information with the grayscale pixel value of 117. By such analogy, the other grayscale areas are determined one by one. The first target grayscale pixel information can be divided into 3 first grayscale areas, the minimum grayscale pixel value of the first grayscale area is 67, the minimum grayscale pixel value of the second first grayscale area is 98, and the minimum grayscale pixel value of the third first grayscale area is 73.

Figure 7:
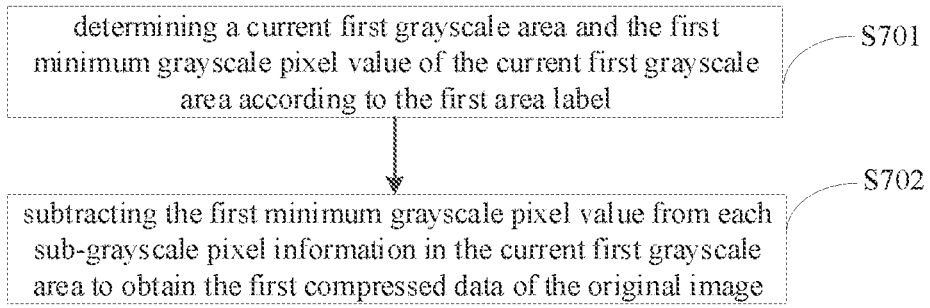
FIG. 7 is a schematic flowchart of an embodiment of S104 provided by an embodiment of the present disclosure.

In some embodiments of the present disclosure, referring to FIG. 7, the step of S104 includes:

S701, determining a current first grayscale area and the first minimum grayscale pixel value of the current first grayscale area according to the first area label.

S702, subtracting the first minimum grayscale pixel value from each sub-grayscale pixel information in the current first grayscale area to obtain the first compressed data of the original image.

In this embodiment, the first minimum grayscale pixel value is subtracted from each sub-pixel information in the current first grayscale area, so that the high-grayscale pixel information is converted into the low-grayscale pixel information, which reduces amount of data transmission, thereby reducing power consumption and the space occupied by the first compressed data. Moreover, in this embodiment of the present disclosure, the first minimum grayscale pixel value is subtracted from each sub-pixel information in the current first grayscale area to minimize the amount of data transmission.

Figure 8:
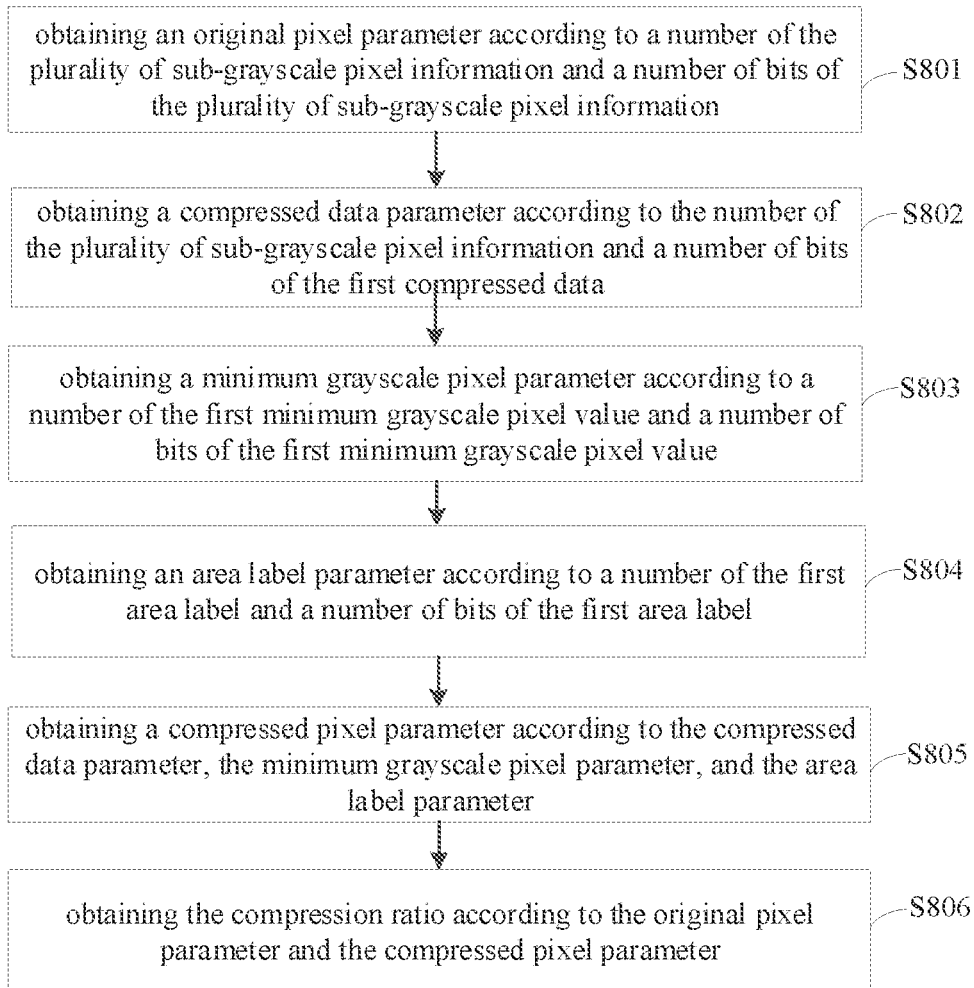
FIG. 8 is a schematic flowchart of an embodiment for calculating a compression ratio provided by an embodiment of the present disclosure.

It should be noted that in order to make the compressed first compressed data satisfy a requirement, in some embodiments of the present disclosure, it is determined whether the first compressed data satisfies the requirement by determining the compression ratio. Specifically, the compression ratio is obtained according to the first compressed data and the first area information. Referring to FIG. 8, the step of obtaining the compression ratio according to the first compressed data and the first area information includes:

S801, obtaining an original pixel parameter according to a number of the plurality of sub-grayscale pixel information and a number of bits of the plurality of sub-grayscale pixel information.

S802, obtaining a compressed data parameter according to the number of the plurality of sub-grayscale pixel information and a number of bits of the first compressed data.

S803, obtaining a minimum grayscale pixel parameter according to a number of the first minimum grayscale pixel value and a number of bits of the first minimum grayscale pixel value.

S804, obtaining an area label parameter according to a number of the first area label and a number of bits of the first area label.

S805, obtaining a compressed pixel parameter according to the compressed data parameter, the minimum grayscale pixel parameter, and the area label parameter.

S806, obtaining the compression ratio according to the original pixel parameter and the compressed pixel parameter.

An original pixel parameter is a product of the number of the plurality of sub-grayscale pixel information and the number of bits of the plurality of sub-grayscale pixel information. The compressed data parameter is a product of the number of the plurality of sub-grayscale pixel information and the number of bits of the first compressed data. The minimum grayscale pixel parameter is a product of the number of the first minimum grayscale pixel value and the number of bits of the first minimum grayscale pixel value. The area label parameter is a product of the number of labels in the first area and the number of bits of the first area label. The compressed pixel parameter is the sum of the compressed data parameter, the minimum grayscale pixel parameter, and the area label parameter. The compression ratio is the ratio of the compressed pixel parameter to the original pixel parameter.

Specifically, the compression ratio is:

$$P=(M*B+X*C+Y*D)/(M*A)$$

Wherein, P stands for the compression ratio. M stands for the number of a plurality of sub-grayscale pixel information. X stands for the number of the first smallest grayscale pixel value. Y stands for the number of labels in the first area. A stands for the number of bits of a plurality of sub-grayscale pixel information. B stands for the number of bits of the first compressed data. C stands for the number of bits of the first smallest grayscale pixel value. D stands for the number of bits of the first area label.

It should be noted that in some embodiments of the present disclosure, the sub-grayscale pixel information, the first area label, the first minimum grayscale pixel value, and the first compressed data are all represented by binary numbers.

In the above formula, the value of M*A is a fixed value. Therefore, to reduce the compression ratio P, it is necessary to reduce any of B, C, D, X, or Y. Furthermore, since the first compressed data to be transmitted after image compression is mainly the first compressed data, the number of bits of the first compressed data should be reduced first. When the number of bits of the first compressed data is constant, the first grayscale difference threshold and the first minimum grayscale pixel value will also be determined.

This is because when the number of bits of the first compressed data is constant, in order to reduce the compression ratio as much as possible, the number of the first minimum grayscale pixel value and the first area label should be minimized, and the grayscale difference threshold Th is 2B−1. Specifically, when the number of bits of the first compressed data is 5, the first grayscale difference threshold is 31. When the number of bits of the first compressed data is 4, the first grayscale difference threshold is 15.

Taking the compression method in FIG. 6 as an example, M is equal to 24, X is equal to 3, Y is equal to 3, A is equal to 8, B is equal to 5, C is equal to 8, D is equal to 1, then the compression ratio P is equal to 76.56%.

In some embodiments of the present disclosure, when the grayscale pixel information distribution is relatively discrete, namely, the difference between the sub-grayscale pixel information is large, in order to further reduce the compression ratio of the first compressed data, the first minimum grayscale pixel values of the first grayscale areas in the plurality of first grayscale areas are different, and a number of bits of the first smallest grayscale pixel value is also different. Referring to FIG. 9, the step of S803 includes:

S901, obtaining the first minimum grayscale pixel value and the number of bits of the first minimum grayscale pixel value of each first grayscale area in the plurality of first grayscale areas, and obtaining a sub-minimum grayscale pixel parameter of each first grayscale area in the plurality of first grayscale areas according to the first minimum grayscale pixel value and the number of bits of the first minimum grayscale pixel value.

S902, obtaining the grayscale pixel parameter according to the sub-minimum grayscale pixel parameter of each first grayscale area in the plurality of first grayscale areas.

Specifically, the compression ratio is:

$$P=[M*B+\Sigma 1n(X*C)+Y*D]/(M*A)$$

Wherein, n stands for the number of the first grayscale area.

Specifically, When the first minimum grayscale pixel value is less than 32 and greater than 16, the number of bits of the first minimum grayscale pixel value is 5. When the first minimum grayscale pixel value is less than 64 and greater than 32, the number of bits of the first minimum grayscale pixel value is 6. When the number of bits of the first minimum grayscale pixel value is less than 128 and greater than 64, the number of bits of the first minimum grayscale pixel value 11 is 7. When the number of bits of the first minimum grayscale pixel value is less than 256 and greater than 128, the number of bits of the first minimum grayscale pixel value is 8.

Through the above settings, the compression ratio can be further reduced, and the compression efficiency of the image compression method can be improved.

Since the first area label is only used to indicate different first grayscale areas, in order to further reduce the compression ratio, in some embodiments of the present disclosure, the first area label occupies one bit, a value of the first area label is 0 or 1, and values of the first area labels of two adjacent first grayscale areas are different from each other. Namely, different grayscale areas are identified through the jump of the first area label. Specifically, the initialized first area label is 0, that is, the first area label of the first grayscale area is 0. When the second first grayscale area is determined, the first area label jumps to 1, when the third first grayscale area is determined, the first area label jumps to 0, and so on.

Different first grayscale areas can be identified by the jump of the first area label 0 or 1, namely, different first grayscale areas can be realized with only one bit, which can further reduce the compression ratio.

In some embodiments of the present disclosure, in order to obtain the best compression ratio, referring to FIG. 10, the image compression method further includes:

S1001, obtaining the compression ratio according to the first compressed data and the first area information, and determining whether the compression ratio is less than or equal to a preset compression ratio.

S1002, on the condition that the compression ratio is greater than a preset compression ratio, determining a second grayscale difference threshold.

It should be understood that the second grayscale difference threshold is less than the first grayscale difference threshold.

S1003, dividing the first target grayscale pixel information into a plurality of second grayscale areas according to the second grayscale difference threshold to generate a second area information, wherein the second area information includes a second minimum grayscale pixel value and a second area label of each second grayscale area in the plurality of second grayscale areas.

S1004, compressing the sub-grayscale pixel information of each second grayscale area according to the second minimum grayscale pixel value, the second area label, and the plurality of sub-grayscale pixel information, to obtain a second compressed data of the original image.

By judging the compression ratio until the compression ratio is less than or equal to the preset compression ratio, the reliability of the image compression method can be improved.

Referring to FIG. 11, when the preset compression ratio is 74%, according to the compression method shown in FIG. 6, the compression ratio is 76.56%, which does not satisfy the requirement. Lower the grayscale difference threshold to 15, namely, the bit of the first compressed data is 124, then M is equal to 24, X is equal to 5, Y is equal to 5, A is equal to 8, B is equal to 4, C is equal to 8, D is equal to 1, and the compression ratio P is 73.43%, which satisfies the requirement.

In some embodiments of the present disclosure, referring to FIG. 10, the image compression method further includes:

S1201, obtaining the compression ratio according to the first compressed data and the first area information, and determining whether the compression ratio is less than or equal to a preset compression ratio.

S1202, on the condition that the compression ratio is greater than a preset compression ratio, determining a second scanning sequence.

S1203, scanning the plurality of sub-grayscale pixel information according to the second scanning sequence to obtain a second target grayscale pixel information.

S1204, dividing the second target grayscale pixel information into a plurality of third grayscale areas according to a preset first grayscale difference threshold to generate a third area information, wherein the third area information includes a third minimum grayscale pixel value and a third area label of each third grayscale area in the plurality of third grayscale areas.

S1205, compressing the sub-grayscale pixel information of each third grayscale area according to the third minimum grayscale pixel value, the third area label, and the plurality of sub-grayscale pixel information, to obtain a third compressed data of an original image.

Another method of reducing the compression ratio improves the applicability of the image compression method.

Figure 13:
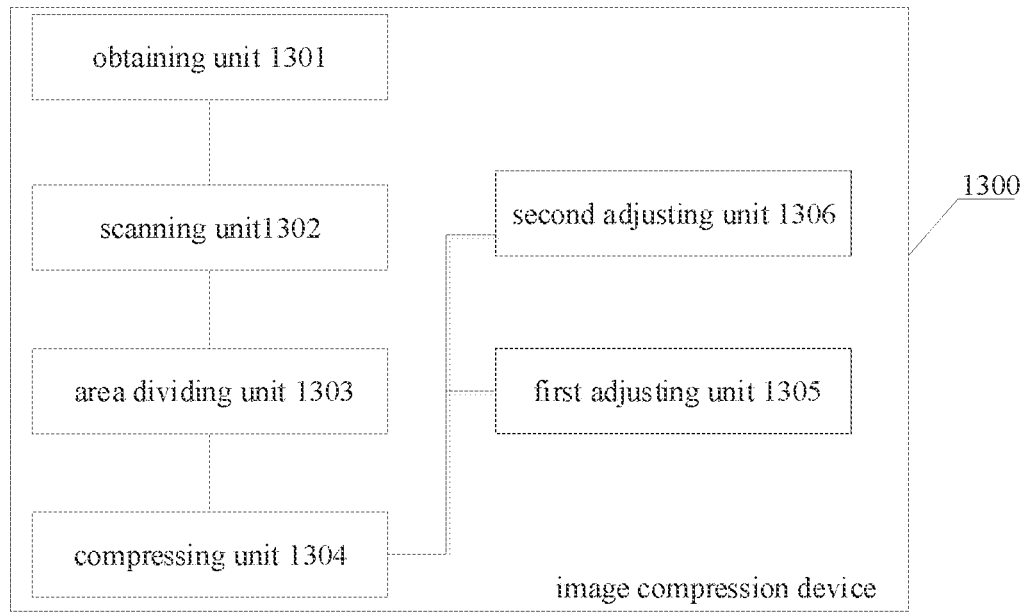
FIG. 13 is a schematic structural diagram of an embodiment of an image compression device provided by an embodiment of the present disclosure.

In another aspect, in order to better implement the image compression method of the embodiment of the present disclosure, on the basis of the image compression method, correspondingly, as shown in FIG. 13, an image compression device is also provided in an embodiment of the present disclosure. The image compression device 1300 includes:

An obtaining unit 1301, configured to obtain a grayscale pixel information of an original image, and the grayscale pixel information includes a plurality of sub-grayscale pixel information.

The original image includes but is not limited to red sub-pixels, green sub-pixels, and blue sub-pixels. When obtaining the grayscale pixel information of the original image, the grayscale pixel information of different sub-pixels may be obtained respectively. Specifically, the step of obtaining the grayscale pixel information of the original image includes: obtaining grayscale pixel information of the red sub-pixels, or obtaining grayscale pixel information of the green sub-pixels, or obtaining grayscale pixel information of the blue sub-pixels.

A scanning unit 1032, configured to scan the plurality of sub-grayscale pixel information according to a preset first scanning sequence to obtain a first target grayscale pixel information.

It should be noted that in some embodiments of the present disclosure, the grayscale pixel information of the original image is pixel information in a two-dimensional sequence, and the first target grayscale pixel information is pixel information in a one-dimensional sequence.

An area dividing unit 1303, configured to divide the first target grayscale pixel information into a plurality of first grayscale areas according to a preset first grayscale difference threshold to generate a first area information, wherein the first area information includes a first minimum grayscale pixel value and a first area label of each first grayscale area in the plurality of first grayscale areas.

A compressing unit 1304, configured to compress the sub-grayscale pixel information of each first grayscale area according to the first minimum grayscale pixel value, the first area label, and the plurality of sub-grayscale pixel information, to obtain a first compressed data of an original image.

The present disclosure provides an image compression device 1300. During image compression, the scanning unit 1302 scans a plurality of sub-grayscale pixel information according to a preset first scanning sequence to obtain a first target grayscale pixel information. The area dividing unit 1303 divides the first target grayscale pixel information into a plurality of first grayscale areas according to a preset first grayscale difference threshold, and a first minimum grayscale pixel value and a first area label of each first grayscale area in the plurality of first grayscale areas are obtained. And the compressing unit 1304 compresses the sub-grayscale pixel information of each first grayscale area according to the first minimum grayscale pixel value and the first area label, so that a high-grayscale grayscale pixel information is converted into a low-grayscale first compressed data. The data transmission volume of the image in the transmission process is reduced, the transmission rate is increased, and the power consumption is reduced. The compressed data after compression also occupies a smaller memory space, which reduces the storage space. Furthermore, by dividing the first target grayscale pixel information into a plurality of first grayscale areas, each first grayscale area is compressed, and the compression rate of the image compression method is further improved.

In an alternative embodiment of the present disclosure, the compressing unit 1304 is configured to: determine a current first grayscale area and the first minimum grayscale pixel value of the current first grayscale area according to the first area label; and subtract the first minimum grayscale pixel value from each sub-grayscale pixel information in the current first grayscale area to obtain the first compressed data of the original image.

In an alternative embodiment of the present disclosure, referring to FIG. 13, the image compression device 1300 further includes a first adjusting unit 1305, the first adjusting unit 1305 is configured to: obtain a compression ratio according to the first compressed data and the first area information, and determine whether the compression ratio is less than or equal to a preset compression ratio; on condition that the compression ratio is greater than a preset compression ratio, determine a second grayscale difference threshold; divide the first target grayscale pixel information into a plurality of second grayscale areas according to the second grayscale difference threshold to generate a second area information, wherein the second area information includes a second minimum grayscale pixel value and a second area label of each second grayscale area in the plurality of second grayscale areas; and compress the sub-grayscale pixel information of each second grayscale area according to the second minimum grayscale pixel value, the second area label, and the plurality of sub-grayscale pixel information, to obtain a second compressed data of the original image.

In an alternative embodiment of the present disclosure, referring to FIG. 13, the image compression device 1300 includes a second adjusting unit 1306, the second adjusting unit is configured to: obtain the compression ratio according to the first compressed data and the first area information, and determine whether the compression ratio is less than or equal to a preset compression ratio; on the condition that the compression ratio is greater than a preset compression ratio, determine a second scanning sequence; scan the plurality of sub-grayscale pixel information according to the second scanning sequence to obtain a second target grayscale pixel information; divide the second target grayscale pixel information into a plurality of third grayscale areas according to a preset first grayscale difference threshold to generate a third area information, wherein the third area information includes a third minimum grayscale pixel value and a third area label of each third grayscale area in the plurality of third grayscale areas; and compress the sub-grayscale pixel information of each third grayscale area according to the third minimum grayscale pixel value, the third area label, and the plurality of sub-grayscale pixel information, to obtain a third compressed data of an original image.

The present disclosure further provides a computer device, which integrates any image compression device provided in the embodiments of this disclosure, and the computer device includes:
a processor or a plurality of processors;
a memory; and
a computer program or a plurality of computer programs, wherein the computer program or the plurality of computer programs are stored in the memory, and the computer program or the plurality of computer programs are configured to execute the steps in the image compression method of any one of the above.

Figure 14:
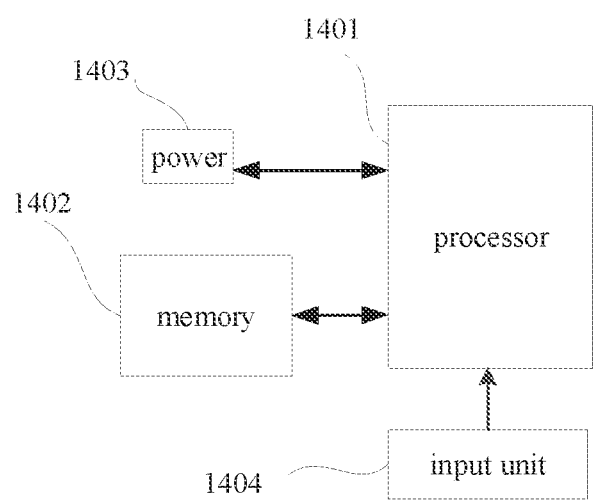
FIG. 14 is a schematic flowchart of an embodiment of a computer device provided by an embodiment of the present disclosure.

The present disclosure provides a computer device, which integrates any image compression device provided in the embodiments of this disclosure. Referring to FIG. 14, a schematic flowchart of an embodiment of a computer device is provided by an embodiment of the present disclosure.

The computer device may include components such as a processor 1401 having one or more processing cores, a memory 1402 having one or more computer-readable storage media, a power 1403, and an input unit 1404. Those skilled in the art can understand that the structure of the computer device shown in FIG. 14 does not constitute a limitation on the computer device, and may include more or less components than shown in the FIG., or combine certain components, or different component arrangements.

The processor 1401 is the control center of the computer device, and uses various interfaces and lines to connect various parts of the entire computer device. The processor 1401 executes various functions of the computer device and processes data by running or executing software programs and/or modules stored in the memory 1402 and calling data stored in the memory 1402 to perform various functions and processing data of the computer device, thereby monitoring the computer device as a whole. Optionally, the processor 1401 may include one or more processing cores. Preferably, the processor 1401 may integrate a disclosure processor and a modem processor. The disclosure processor mainly deals with operating systems, operating user interfaces, and disclosure programs, and the modem processor mainly deals with wireless communication. It can be understood that the foregoing modem processor may not be integrated into the processor 1401.

The memory 1402 can be used to store software programs and modules. The processor 1401 executes various functional disclosures and data processing by running software programs and modules stored in the memory 1402. The memory 1402 may mainly include a program storage area and a data storage area. The storage program area can store the operating system, at least one disclosure program required by the function (such as sound playback function, image playback function, etc.), etc. The data storage area can store data created according to the use of computer device, etc. In addition, the memory 1402 may include a high-speed random access memory. The memory 1402 may also include non-volatile memory, such as at least one magnetic disk storage device, flash memory device, or other volatile solid-state storage device. Correspondingly, the memory 1402 may further include a memory controller to provide the processor 1401 with access to the memory 1402.

The computer device also includes a power 1403 for supplying power to various components. Preferably, the power 1403 may be logically connected to the processor 1401 through a power management system, so that functions such as charging, discharging, and power consumption management can be managed through the power management system. The power 1403 may also include any components such as one or more DC or AC power supplies, recharging systems, power failure detection circuits, power converters or inverters, and power status indicators.

The computer device may further include an input unit 1404, which can be used to receive inputted digital or character information, and generate keyboard, mouse, joystick, optical or trackball signal input related to operating user settings and function control.

Although not shown, the computer device may also include a display unit, etc., which will not be repeated here. Specifically, in this embodiment, the processor 1401 in the computer device loads the executable files corresponding to the processes of one or more disclosure programs into the memory 1402 according to the following instructions, and the processor 1401 runs the disclosure programs stored in the memory 1402 to realize various functions, as follows:

obtaining a grayscale pixel information of an original image, wherein the grayscale pixel information includes a plurality of sub-grayscale pixel information;

scanning the plurality of sub-grayscale pixel information according to a preset first scanning sequence to obtain a first target grayscale pixel information;

dividing the first target grayscale pixel information into a plurality of first grayscale areas according to a preset first grayscale difference threshold to generate a first area information, wherein the first area information includes a first minimum grayscale pixel value and a first area label of each first grayscale area in the plurality of first grayscale areas;

compressing the sub-grayscale pixel information of each first grayscale area according to the first minimum grayscale pixel value, the first area label, and the plurality of sub-grayscale pixel information, to obtain a first compressed data of an original image.

A person of ordinary skill in the art can understand that all or part of the steps in the various methods of the foregoing embodiments may be completed by instructions, or by instructions to control related hardware. The instructions can be stored in a computer-readable storage medium and loaded and executed by the processor.

The embodiment of the present disclosure provides a computer-readable storage medium. The storage medium may include a read-only memory (ROM), a random access memory (RAM), a magnetic disk or an optical disk, and so on. A computer program is stored in the computer readable storage medium, and the computer program is loaded by a processor to execute the steps in the image compression method of any one of the above. For example, the computer program can be loaded by the processor to perform the following steps:

Obtaining a grayscale pixel information of an original image, wherein the grayscale pixel information includes a plurality of sub-grayscale pixel information;

Scanning the plurality of sub-grayscale pixel information according to a preset first scanning sequence to obtain a first target grayscale pixel information;

Dividing the first target grayscale pixel information into a plurality of first grayscale areas according to a preset first grayscale difference threshold to generate a first area information, wherein the first area information includes a first minimum grayscale pixel value and a first area label of each first grayscale area in the plurality of first grayscale areas; and Compressing the sub-grayscale pixel information of each first grayscale area according to the first minimum grayscale pixel value, the first area label, and the plurality of sub-grayscale pixel information, to obtain a first compressed data of an original image.

In the above embodiments, the description of each embodiment has its own emphasis, for a part that is not detailed in an embodiment, you can refer to the related descriptions of other embodiments.

In specific implementation, each of the above units or structures can be implemented as independent entities, and can also be implemented as the same or several entities in any combination. For the specific implementation of each of the above units or structures, refer to the previous method embodiments, which will not be repeated here.

The image compression method and the image compression device provided by the embodiments of the present disclosure are described in detail above, specific examples are used to explain the principle and implementation of the present disclosure, the descriptions of the above embodiments are only used to help understand the present disclosure technical solutions and their core ideas. Those of ordinary skill in the art should understand that they can still modify the technical solutions described in the foregoing embodiments, or equivalently replace some of the technical features. These modifications or replacements, and the essence of the corresponding technical solutions does not deviate from the scope of the technical solutions of the embodiments of the present disclosure.

What is claimed is:

1. An image compression method, comprising:

obtaining a grayscale pixel information of an original image, wherein the grayscale pixel information comprises a plurality of sub-grayscale pixel information;

scanning the plurality of sub-grayscale pixel information according to a preset first scanning sequence to obtain a first target grayscale pixel information;

dividing the first target grayscale pixel information into a plurality of first grayscale areas according to a preset first grayscale difference threshold to generate a first area information, wherein the first area information comprises a first minimum grayscale pixel value and a first area label of each first grayscale area in the plurality of first grayscale areas; and compressing the sub-grayscale pixel information of each first grayscale area according to the first minimum grayscale pixel value, the first area label, and the plurality of sub-grayscale pixel information, to obtain a first compressed data of the original image;

wherein the image compression method further comprises:

obtaining a compression ratio according to the first compressed data and the first area information, and determining whether the compression ratio is less than or equal to a preset compression ratio; and on condition that the compression ratio is greater than the preset compression ratio, determining a second grayscale difference threshold or a second scanning sequence.

2. The image compression method of claim 1, wherein the step of compressing the sub-grayscale pixel information of each first grayscale area according to the first minimum grayscale pixel value, the first area label, and the plurality of sub-grayscale pixel information, to obtain the first compressed data of the original image comprises:

determining a current first grayscale area and the first minimum grayscale pixel value of the current first grayscale area according to the first area label; and subtracting the first minimum grayscale pixel value from each sub-grayscale pixel information in the current first grayscale area to obtain the first compressed data of the original image.

3. The image compression method of claim 1, wherein in each of the first grayscale areas, a difference value between a maximum sub-grayscale pixel information and a minimum sub-grayscale pixel information is smaller than the first grayscale difference threshold.

4. The image compression method of claim 1, further comprising:

dividing the first target grayscale pixel information into a plurality of second grayscale areas according to the second grayscale difference threshold to generate a second area information, wherein the second area information comprises a second minimum grayscale pixel value and a second area label of each second grayscale area in the plurality of second grayscale areas; and compressing the sub-grayscale pixel information of each second grayscale area according to the second minimum grayscale pixel value, the second area label, and the plurality of sub-grayscale pixel information, to obtain a second compressed data of the original image.

5. The image compression method of claim 4, wherein the sub-grayscale pixel information, the first area label, the first minimum grayscale pixel value, and the first compressed data are represented by binary numbers;

the step of obtaining the compression ratio according to the first compressed data and the first area information comprises:

obtaining an original pixel parameter according to a number of the plurality of sub-grayscale pixel information and a number of bits of the plurality of sub-grayscale pixel information;

obtaining a compressed data parameter according to the number of the plurality of sub-grayscale pixel information and a number of bits of the first compressed data;

obtaining a minimum grayscale pixel parameter according to a number of the first minimum grayscale pixel value and a number of bits of the first minimum grayscale pixel value;

obtaining an area label parameter according to a number of the first area label and a number of bits of the first area label;

obtaining a compressed pixel parameter according to the compressed data parameter, the minimum grayscale pixel parameter, and the area label parameter; and obtaining the compression ratio according to the original pixel parameter and the compressed pixel parameter.

6. The image compression method of claim 5, wherein the first minimum grayscale pixel value of each first grayscale area in the plurality of first grayscale areas is different;

the step of obtaining the minimum grayscale pixel parameter according to the number of the first minimum grayscale pixel value and the number of bits of the first minimum grayscale pixel value comprises:

obtaining the first minimum grayscale pixel value and the number of bits of the first minimum grayscale pixel value of each first grayscale area in the plurality of first grayscale areas, and obtaining a sub-minimum grayscale pixel parameter of each first grayscale area in the plurality of first grayscale areas according to the first minimum grayscale pixel value and the number of bits of the first minimum grayscale pixel value; and obtaining the grayscale pixel parameter according to the sub-minimum grayscale pixel parameter of each first grayscale area in the plurality of first grayscale areas.

7. The image compression method of claim 5, wherein after the step of scanning the plurality of sub-grayscale pixel information according to the preset first scanning sequence to obtain the first target grayscale pixel information, the image compression method further comprises:

setting the first grayscale difference threshold Th to 2B−1, wherein the B stands for the number of bits of the first compressed data.

8. The image compression method of claim 5, wherein the first area label occupies one bit, a value of the first area label is 0 or 1, and values of the first area labels of two adjacent first grayscale areas are different from each other.

9. The image compression method of claim 1, further comprising:

scanning the plurality of sub-grayscale pixel information according to the second scanning sequence to obtain a second target grayscale pixel information;

dividing the second target grayscale pixel information into a plurality of third grayscale areas according to the preset first grayscale difference threshold to generate a third area information, wherein the third area information comprises a third minimum grayscale pixel value and a third area label of each third grayscale area in the plurality of third grayscale areas; and compressing the sub-grayscale pixel information of each third grayscale area according to the third minimum grayscale pixel value, the third area label, and the plurality of sub-grayscale pixel information, to obtain a third compressed data of the original image.

10. An image compression device, comprising:

an obtaining unit, configured to obtain a grayscale pixel information of an original image, wherein the grayscale pixel information comprises a plurality of sub-grayscale pixel information;

a scanning unit, configured to scan the plurality of sub-grayscale pixel information according to a preset first scanning sequence to obtain a first target grayscale pixel information;

an area dividing unit, configured to divide the first target grayscale pixel information into a plurality of first grayscale areas according to a preset first grayscale difference threshold to generate a first area information, wherein the first area information comprises a first minimum grayscale pixel value and a first area label of each first grayscale area in the plurality of first grayscale areas; and a compressing unit, configured to compress the sub-grayscale pixel information of each first grayscale area according to the first minimum grayscale pixel value, the first area label, and the plurality of sub-grayscale pixel information, to obtain a first compressed data of the original image;

wherein the image compression device a first adjusting unit, and the first adjusting is configured to:

obtain a compression ratio according to the first compressed data and the first area information, and determine whether the compression ratio is less than or equal to a preset compression ratio;

on condition that the compression ratio is greater than the preset compression ratio, determine a second grayscale difference threshold or a second grayscale difference threshold.

11. The image compression device of claim 10, wherein the compressing unit is configured to:

determine a current first grayscale area and the first minimum grayscale pixel value of the current first grayscale area according to the first area label; and subtract the first minimum grayscale pixel value from each sub-grayscale pixel information in the current first grayscale area to obtain the first compressed data of the original image.

12. The image compression device of claim 10, wherein in each of the first grayscale areas, a difference value between a maximum sub-grayscale pixel information and a minimum sub-grayscale pixel information is smaller than the first grayscale difference threshold.

13. The image compression device of claim 10, wherein the first adjusting unit is further configured to:

divide the first target grayscale pixel information into a plurality of second grayscale areas according to the second grayscale difference threshold to generate a second area information, wherein the second area information comprises a second minimum grayscale pixel value and a second area label of each second grayscale area in the plurality of second grayscale areas; and compress the sub-grayscale pixel information of each second grayscale area according to the second minimum grayscale pixel value, the second area label, and the plurality of sub-grayscale pixel information, to obtain a second compressed data of the original image.

14. The image compression device of claim 13, wherein the sub-grayscale pixel information, the first area label, the first minimum grayscale pixel value, and the first compressed data are represented by binary numbers;

the first adjusting unit is further configured to:

obtain an original pixel parameter according to a number of the plurality of sub-grayscale pixel information and a number of bits of the plurality of sub-grayscale pixel information;

obtain a compressed data parameter according to the number of the plurality of sub-grayscale pixel information and a number of bits of the first compressed data;

obtain a minimum grayscale pixel parameter according to a number of the first minimum grayscale pixel value and a number of bits of the first minimum grayscale pixel value;

obtain an area label parameter according to a number of the first area label and a number of bits of the first area label;

obtain a compressed pixel parameter according to the compressed data parameter, the minimum grayscale pixel parameter, and the area label parameter; and obtain the compression ratio according to the original pixel parameter and the compressed pixel parameter.

15. The image compression device of claim 14, wherein the first minimum grayscale pixel value of each first grayscale area in the plurality of first grayscale areas is different;

the first adjusting unit is further configured to:

obtain the first minimum grayscale pixel value and the number of bits of the first minimum grayscale pixel value of each first grayscale area in the plurality of first grayscale areas, and obtain a sub-minimum grayscale pixel parameter of each first grayscale area in the plurality of first grayscale areas according to the first minimum grayscale pixel value and the number of bits of the first minimum grayscale pixel value; and obtain the grayscale pixel parameter according to the sub-minimum grayscale pixel parameter of each first grayscale area in the plurality of first grayscale areas.

16. The image compression device of claim 14, wherein after the step of scan the plurality of sub-grayscale pixel information according to a preset first scanning sequence to obtain a first target grayscale pixel information, the scanning unit is further configured to:

set the first grayscale difference threshold Th to 2B−1, wherein the B stands for the number of bits of the first compressed data.

17. The image compression device of claim 14, wherein the first area label occupies one bit, a value of the first area label is 0 or 1, and values of the first area labels of two adjacent first grayscale areas are different from each other.

18. The image compression device of claim 10, wherein the second adjusting unit is further configured to:

scan the plurality of sub-grayscale pixel information according to the second scanning sequence to obtain a second target grayscale pixel information;

divide the second target grayscale pixel information into a plurality of third grayscale areas according to a preset first grayscale difference threshold to generate a third area information, wherein the third area information comprises a third minimum grayscale pixel value and a third area label of each third grayscale area in the plurality of third grayscale areas; and compress the sub-grayscale pixel information of each third grayscale area according to the third minimum grayscale pixel value, the third area label, and the plurality of sub-grayscale pixel information, to obtain a third compressed data of the original image.

19. A computer device, comprising:

a processor or a plurality of processors;

a memory;

a computer program or a plurality of computer programs, wherein the computer program or the plurality of computer programs are stored in the memory, and the computer program or the plurality of computer programs are configured to execute the steps:

obtaining a grayscale pixel information of an original image, wherein the grayscale pixel information comprises a plurality of sub-grayscale pixel information;

scanning the plurality of sub-grayscale pixel information according to a preset first scanning sequence to obtain a first target grayscale pixel information;

dividing the first target grayscale pixel information into a plurality of first grayscale areas according to a preset first grayscale difference threshold to generate a first area information, wherein the first area information comprises a first minimum grayscale pixel value and a first area label of each first grayscale area in the plurality of first grayscale areas; and compressing the sub-grayscale pixel information of each first grayscale area according to the first minimum grayscale pixel value, the first area label, and the plurality of sub-grayscale pixel information, to obtain a first compressed data of the original image;

wherein the image compression method further comprises:

obtaining a compression ratio according to the first compressed data and the first area information, and determining whether the compression ratio is less than or equal to a preset compression ratio; and on condition that the compression ratio is greater than the preset compression ratio, determining a second grayscale difference threshold or a second scanning sequence.

20. A computer readable storage medium, wherein a computer program is stored in the computer readable storage medium, and the computer program is loaded by a processor to execute steps in the image compression method of claim 1.

* * * * *